United States Patent
Maurer et al.

(10) Patent No.: US 6,731,821 B1
(45) Date of Patent: May 4, 2004

(54) METHOD FOR ENHANCING COMPRESSIBILITY AND VISUAL QUALITY OF SCANNED DOCUMENT IMAGES

(75) Inventors: Ron P. Maurer, Haifa (IL); Danny Barash, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 09/675,270

(22) Filed: Sep. 29, 2000

(51) Int. Cl.[7] .............................. G06K 9/36; G06K 9/40
(52) U.S. Cl. ...................... 382/263; 382/264; 382/274; 382/276
(58) Field of Search ................. 382/254, 260, 382/261, 263, 264, 266, 269, 268, 274, 275, 276, 277

(56) References Cited

U.S. PATENT DOCUMENTS

| | | | |
|---|---|---|---|
| 5,396,285 A | * 3/1995 | Hedberg et al. | 348/163 |
| 5,446,502 A | 8/1995 | Lebowsky | 348/625 |
| 5,550,888 A | 8/1996 | Neitzel et al. | 378/98.7 |
| 5,561,724 A | * 10/1996 | Kido et al. | 382/264 |
| 5,563,962 A | * 10/1996 | Peters et al. | 382/261 |
| 5,799,111 A | * 8/1998 | Guissin | 382/254 |
| 5,799,112 A | * 8/1998 | de Queiroz et al. | 382/254 |
| 5,825,937 A | * 10/1998 | Ohuchi et al. | 382/261 |
| 5,892,853 A | * 4/1999 | Hirani et al. | 382/280 |
| 5,933,540 A | * 8/1999 | Lakshminarayanan et al. | 382/260 |
| 6,016,366 A | * 1/2000 | Konstantinides et al. | 382/260 |
| 6,636,645 B1 | * 10/2003 | Yu et al. | 382/268 |

OTHER PUBLICATIONS

Sanjit K. Mitra, et al.; "A New Class of Nonlinear Filters for Image Enhancement"; Apr. 14, 1991; pp. 2525–2528.

Scott T. Acton; "Edge Enhancement of Infrared Imagery by Way of the Anisotropic Diffusion Pyramid"; Sep. 16, 1996; pp. 865–868.

* cited by examiner

*Primary Examiner*—Andrew W. Johns
*Assistant Examiner*—Amir Alavi (57) ABSTRACT

A system and method of image processing for smoothing, denoising, despeckling and sharpening scanned document images which is performed prior to a compression. The scanned image is selectively smoothed by anisotropic diffusion filtering in a single iteration with a 3×3 kernel, which provides denoising, edge-preserving smoothing. The smoothed image data is then selectively sharpened using variable contrast mapping that provides overshoot-free variable-sharpening and despeckling. Image quality is improvides while increasing compressibility of the image.

3 Claims, 5 Drawing Sheets

METHOD FOR ENHANCING COMPRESSIBILITY AND VISUAL QUALITY OF SCANNED DOCUMENT IMAGES

FIELD OF THE INVENTION

The present invention relates to processing of image data and in particular to enhancing quality and compressibility of digital images including combinations of text, graphics, and natural images by selective smoothing/denoising and selective sharpening.

BACKGROUND OF THE INVENTION

Digital image data is often processed to enhance the visual quality of the image. Common image processing techniques include image smoothing and image sharpening. Smoothing is a technique that is mainly performed for reducing certain types of noise. Non-selective (or linear) smoothing algorithms smooth all features in an image (i.e., areas in the image which can be characterized as flat regions and areas within the image which can be characterized as edges). However, it is undesirable to smooth edges since smoothed edges gives the image a "blurry" appearance. Moreover, although smoothing is effective in removing most Gaussian noise, it is less effective in removing high amplitude noise such as speckle noise. Speckle noise can be characterized as a single unintentional black dot in a white region or a single unintentional white dot in a black region.

Generally, sharpening is a technique in which the edges within the image are sharpened to improve the visual quality of an image. This technique is often performed to enhance the visual quality of text or graphics within an image. One disadvantage of non-selective sharpening techniques is that they also tend to amplify noise.

Selective (or non-linear) filters such as selective smoothing or selective sharpening filters overcome the disadvantages of non-selective filters by applying the filtering function only to the features that are to be smoothed/sharpened while preserving the non-selected features. Selective filters include some means of identifying or differentiating between features, so that the filter is applied only to the desired feature. One example of an edge preserving, selective smoothing filter is an anisotropic diffusion filter.

Due to its denoising nature, the anisotropic diffusion filtering technique has recently been considered for enhancing compressibility. Specifically, an anisotropic diffusion filter was iteratively applied to image data between 10 and 20 times to obtain an optimal ratio between a visual quality measure and the bit-per-pixel (bpp) compression rate. It was found that applying 5 iterations produced images that were perceptually equivalent to the original images and the compression bit-rate was improved by 5%–17.5%. Although this technique shows that anisotropic diffusion can be used to improve image compressibility, it is impractical for real-time image processing applications such as image scanning since many time consuming iterations are required to obtain the desired image quality and compressibility. In addition, the conventional anisotropic diffusion technique does not clean speckle noise and other types of high amplitude noise and is thus insufficient for pre-processing scanned document images.

Another denoising/smoothing filtering technique that has been suggested for compression enhancement applications is a Sigma-filter that is even more computationally expensive per iteration than anisotropic diffusion filtering (although it requires less iterations for achieving the same noise reduction). However, this technique is still not fast enough for applications for processing full-page images or real-time image processing. Like the anisotropic diffusion filter, the Sigma-filter also does not remove high amplitude noise.

Finally, in the case of both denoising techniques (i.e., anisotropic diffusion filtering and Sigma pre-processing) each was considered for processing only natural images. However, application of these techniques on document images containing text, graphics, and natural images was not considered since it is well known that denoising filters (particularly applied in many iterations) degrade the quality of textual and graphical images. Specifically, edge sharpness of text features is degraded.

What is needed is an image processing technique which can be applied to combination-type (i.e., text, graphical, natural) document images and which increases compressibility while enhancing image quality with low computational complexity for real-time applications.

SUMMARY OF THE INVENTION

A system and method of enhancing image data and increasing compressibility of data by selectively smoothing the image data while preserving edges and selectively sharpening image data using variable contrast stretching. In one embodiment, variable contrast stretching is performed by clipping those pixel intensity values outside of a variable range and mapping those pixel intensity values within the variable range. In another embodiment, selective smoothing is performed using a robust anistotropic diffusion (RAD) filter.

DETAILED DESCRIPTION OF THE INVENTION

In general, the present invention is an image processing method and system for performing both selective image smoothing/denoising and selective image sharpening using variable contrast stretching such that when performing selective image smoothing, areas within the image characterized as flat regions are smoothed/denoised while areas within the image characterized as edges are essentially preserved and when performing selective image sharpening using variable contrast stretching, edges within the image are sharpened without canceling out the smoothing/denoising effects on the flat regions obtained during selective smoothing and also without introducing overshoot noise at edges. Variable contrast stretching is performed by dynamically clipping pixel values which, besides sharpening, is also effective in removing speckle noise that is not removed during selective smoothing.

The combination of denoising (i.e., noise removing) obtained from selective smoothing and despeckling (i.e., speckle removing) obtained from selective sharpening results in significant noise reduction. Reducing image noise allows for increased compressibility. Hence, the system and method of image processing of the present invention is particularly adaptable to pre-processing image data prior to compression so as to enhance image compressibility while maintaining or improving image quality. For example, in one compression method based on a bit-plane representation which applies lossless compression to a truncated set of bit planes as described in the application entitled "Method Including Lossless Compression of Luminance Channel and Lossy Compression of Chrominance Channels" filed Sep. 29, 2000 and assigned to the assignee of the present invention, the compression ratio is increased in a range of approximately 30–50%.

Since selective sharpening according to the present invention retains smoothing/denoising effects from the selective smoothing, the image can be initially oversmoothed during selective smoothing to obtain increased denoising and then selectively sharpened to re-sharpen edges that might have been affected by the smoothing algorithm thereby providing significant denoising capability.

The system and method of the present invention requires minimal computation steps since a single iteration of each of selective smoothing and sharpening techniques achieves acceptable image quality and compressibility.

Figure 1:
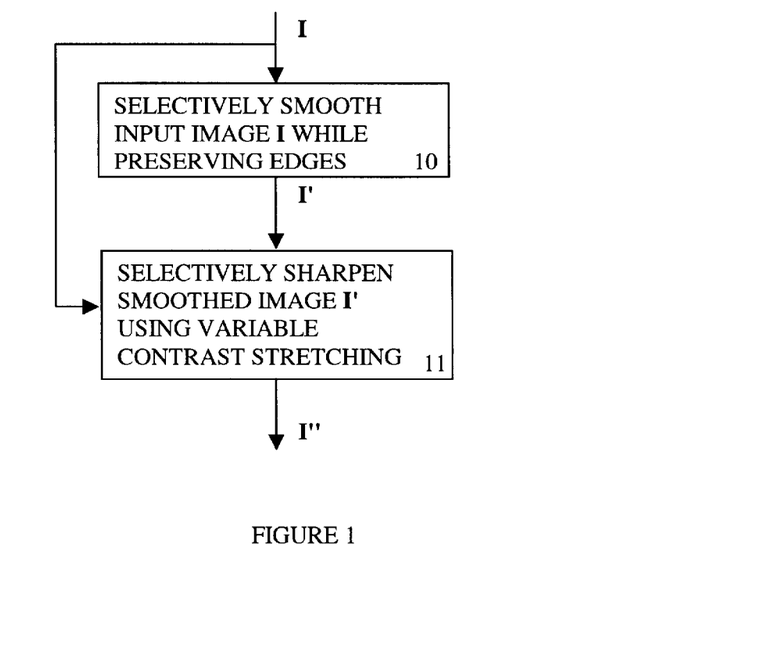
FIG. 1 illustrates a first embodiment of the image processing method of the present invention.

FIG. 1 shows a first generalized embodiment of the method of the present invention in which selective smoothing is performed using any edge preserving image smoothing/denoising technique (10) and selectively sharpening is performed on the selectively smoothed image data using variable contrast stretching (11). As shown, input image data I is coupled to the input of the selective smoothing stage which generates selectively smoothed image data I' wherein areas within the image characterized as flat regions are smoothed/denoised and areas within the image characterized as edges are essentially preserved. The selectively smoothed data I' as well as the original image data I is coupled to the selective sharpening stage. The smoothed image data I' is sharpened dependent on dynamic contrast information obtained from original image data I wherein edges are sharpened such that denoising benefits obtained while smoothing are unaffected. In one embodiment, the method of image processing is performed in a single iteration.

Edge-preserving image smoothing/denoising techniques can be performed by anisotropic-type diffusion filtering, non-linear smoothing/denoising filtering, bilateral-type filtering, Sigma filtering, order statistics filtering such as median filtering, or any other type of edge preserving smoothing filter. In one type of edge-preserving smoothing filter, pixel data corresponding to edges within the image data are identified and the smoothing filter function is applied to flat regions and is not applied to the identified edges. In general, linear smoothing is an operation where the pixel value is replaced by a weighted average of its neighbors. This attenuates high frequency components, namely abrupt changes in pixel intensity. It should be understood that the degree of edge preserving obtained when selectively smoothing is, in part, dependent on the reliability/robustness of how edges are differentiated from flat regions by the edge preserving smoothing filter and the strength of the smoothing filter. As a result, some edges may incur some smoothing.

Selective sharpening is performed using variable contrast stretching. Selective sharpening using variable contrast stretching is described in an application entitled "Image Sharpening by Variable Contrast Stretching" filed Sep. 29, 2000 and assigned to the assignee of the present invention. Variable contrast stretching reduces spatial scale of large gray-level transitions, resulting in considerable sharpening of features in computer-generated images (e.g., text, CAD drawings). The variable contrast stretching only mildly reduces the spatial scale of milder gray-level transitions, resulting in a milder sharpening of features in "natural" images (e.g., photographed features, features captured by an image capture device). Thus, the variable contrast stretching applies strong sharpening to computer-generated features and mild sharpening to edges in natural features. The variable contrast stretching improves the appearance and legibility of compound documents containing both natural and computer-generated features. However, the variable contrast stretching does not change the spatial scale for weak gray-level transitions, and thus, does not amplify low amplitude noise.

One of the advantages of the first embodiment of the method of image processing shown in FIG. 1 is that the step of selectively smoothing is effective in removing most noise types including Gaussian-type noise but is ineffective in removing speckle-type noise (e.g., white dots on black or black dots on white) since speckles often appear as edges to selective smoothing filters, while the selective sharpening step using variable contrast stretching is effective in removing the speckle-type noise. As a result, the system and method of image processing removes a significant amount of noise from the image.

Removal of noise from image data allows for increased compressibility of the image data. Accordingly, one application of the image processing method of the present invention is the pre-processing of image data according to the methods shown in FIGS. 1 and 4 prior to compressing the image data.

It should be noted that the effectiveness of the noise removal is dependent on what type of selective smoothing is performed as well as how the variable contrast stretching is adjusted for filtering certain types of image data. Hence, the increased compressibility is dependent on how effectively noise is removed when selectively smoothing and selectively sharpening using variable contrast stretching.

Variable Contrast Stretching

Selective sharpening of smoothed digital image data using variable contrast stretching is performed as follows. The smoothed digital image I' is made up of a plurality of selectively smoothed pixels P'. Each selectively smoothed pixel P' corresponds to an original pre-smoothed pixel P having the same location within the digital image. A point-wise contrast stretching operation $g(\cdot)$ is performed on each selectively smoothed pixel of interest $P_0'$ as follows in Eq. 1:

$$g(P_0') = \begin{cases} P_0' - A \leq -W & m \\ |P_0' - A| < W & A + \frac{D}{2W}(P_0' - A) \\ P_0' - A \geq W & M \end{cases} \quad (\text{Eq. 1})$$

Figure 2:
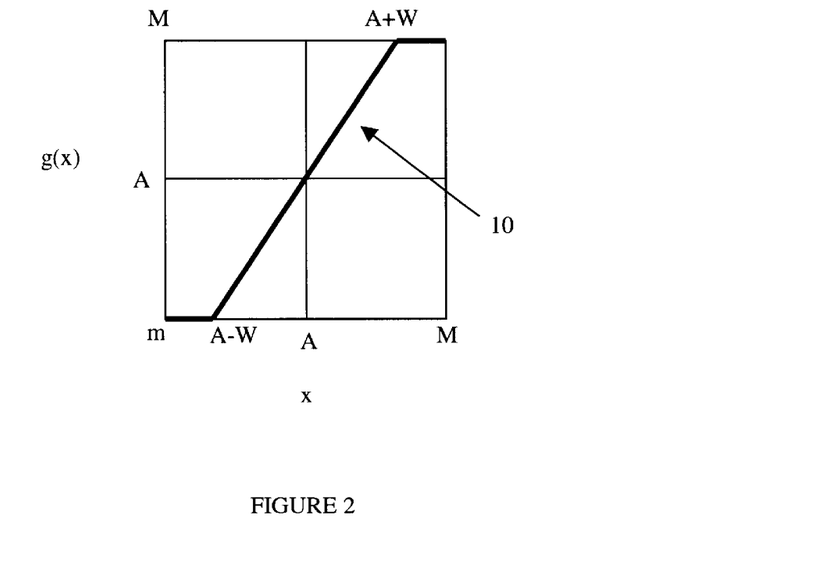
FIG. 2 illustrates an embodiment of the variable contrast stretching function.
Figure 3:
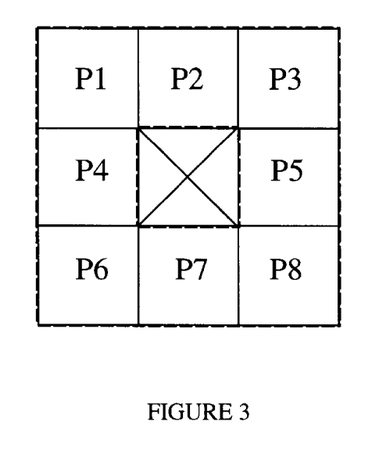
FIG. 3 illustrates a 3×3 hollow neighborhood.

FIG. 2 illustrates the graphical representation of the variable contrast stretching function $g(P_0')$. The pixel of interest $P_0'$ is filtered with respect to a neighborhood of pixels. The neighborhood of pixels corresponds to the hollow (i.e., missing center pixel) neighborhood of the pre-smoothed pixels with respect to the pre-smoothed pixel of interest $P_0$. FIG. 3 illustrates an example of a hollow neighborhood of pre-smoothed pixels. The hollow neighborhood, delineated by a window indicated in dashed lines, includes a 3×3 array of pixels minus a center pixel. The center pixel block designated by an "X", corresponds to the smoothed pixel of interest $P_0'$ to be operated on by the sharpening algorithm.

Since the pre-smoothed neighborhood is used, edges are sharpened dependent on pre-smoothed image dynamic contrast information resulting in more reliable edge sharpening. The maximum gray-value of the neighborhood is denoted by the uppercase letter M, and minimum gray-value of the neighborhood is denoted by the lowercase letter mn. The local dynamic range of the neighborhood, denoted by the letter D, is the difference between minimum and maximum values of the neighborhood (i.e., D=M-m). If, for example, the pixel intensity values are represented by 8-bit words, the lowest intensity value of the pixels in the neighborhood is m=5 and the highest intensity value of the pixels in the neighborhood is M=250, the dynamic range is D=245 for that neighborhood.

A "contrast range" has a width of 2W. The contrast range is centered about the middle (A) of the dynamic range, A=(M+m)/2. Thus, the contrast range has a starting point at A−W and an ending point at A+W.

If the intensity value of the pixel of interest $P_0'$ is outside of the contrast range, the intensity value is clipped to either m or M. If the intensity value of the pixel of interest lies within the contrast range, the amount by which the local contrast is changed is determined by the gradient of the slope of a line segment 10 (FIG. 2) within the contrast range.

The slope of the line segment 10 is a function of the dynamic range. In general, the slope, denoted by S(D), complies with the following:

the slope approaches unity as the dynamic range D approaches 0 (i.e., S→1 as D→0);

the slope is greater than unity when the dynamic range is greater than zero (i.e., S>1 when D≠0); and the slope is a non-decreasing function of the dynamic range (i.e., as the dynamic range increases, the slope becomes larger and the sharpening increases).

Thus the slope is a function of the dynamic range and the contrast range of a given pixel neighborhood. Because a neighborhood is determined for each pixel, the dynamic range, contrast range and the slope are variable on a pixel-by-pixel basis.

There are many different ways of expressing the slope of the line segment 10 (FIG. 2). For example, the slope may be expressed as follows in Eq. 2:

$$S(D) = \frac{D}{2W} = 1 + \frac{D}{R} \qquad \text{(Eq. 2)}$$

where constant R is a single global parameter that corresponds to the dynamic scale for sharpening. Thus, the variable contrast stretching operation within the variable contrast range may be expressed as follows in Eq. 3:

$$g(P_0') = P_0' + \frac{D}{R}(P_0' - A) \ \{|P_0' - A| < W\} \qquad \text{(Eq. 3)}$$

If D>>R, the mapping becomes equivalent to toggle mapping, whereby edges are over-sharpened. Proper selection of the constant R prevents such a problem. For neighborhoods having small dynamic ranges, D<<R and 1+D/R≈1. Therefore, no effective change in contrast will occur for D<<R.

The constant R may be limited to powers of two for computational efficiency. Since the quantity 1+D/R involves a division by the constant R, limiting the constant R to a power of two allows the division to be performed simply by bit-shifting. Thus, $R=2^L$, where integer L>0. As the constant R decreases, the sharpening effect increases since the contrast region 2W is smaller and the slope S(D) of the contrast stretching becomes larger.

For pixel intensity values that are represented by 8-bit words, the preferred value of R is between 64 and 512 (i.e., 6≦L≦9). More generally, if the dynamic range of the entire image is normalized to cover the complete dynamic range of the capturing device (e.g., scanner), the preferred value of R is between one-quarter of the dynamic range and twice the dynamic range.

It should be noted that variable contrast stretching also avoids overshoot. Thus, over-shoot related artifacts do not appear as the result of interpolation of digital images that have been sharpened by variable contrast stretching.

Variable contrast stretching does not enhance low-amplitude noise, and in some cases can slightly reduce low-amplitude noise. Because the variable contrast stretching does not increase low-amplitude noise and it avoids overshoot, compressibility of the sharpened image is not reduced. Consequently, a digital image may be sharpened only once, prior to compression, thus avoiding the need to sharpen the image each time after decompression.

The variable contrast stretching is not limited to linear mapping within the contrast range. Although linear mapping is preferred, non-linear mapping within the contrast range may be performed.

Figure 4:
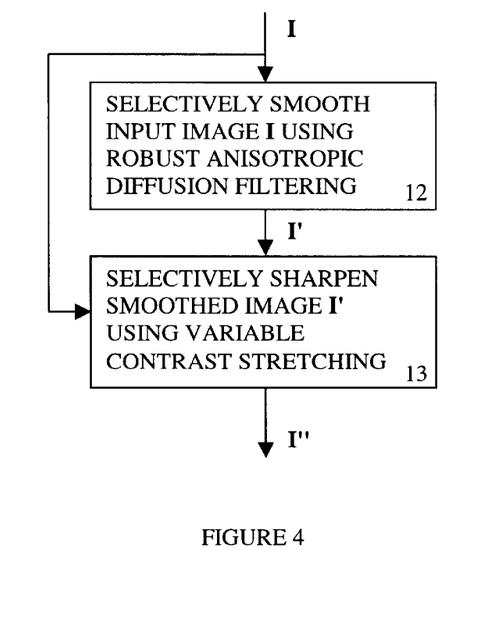
FIG. 4 illustrates a second embodiment of the image processing method of the present invention.

FIG. 4 shows a second embodiment of the method of image processing in which image data is initially selectively smoothed (12) using an edge preserving filtering technique known as Robust-Anisotropic-Diffusion (RAD) filtering and then smoothed data is selectively sharpened using variable contrast stretching (13).

The RAD filter is a type of filter that performs selective smoothing by simulating a diffusion process on the image where the diffusivity depends locally on the strength of a feature type, i.e., an edge. The selectivity mechanism is based on robust statistics and in particular to an influence function ψ of a robust error-norm. In this embodiment, RAD filtering is applied in a single iteration to a 3×3 neighborhood (i.e., kernel) of each pixel of interest $P_0$ in the input image data I to generate a smoothed pixel $P_0'$.

For each pixel of interest, $P_0$ the following RAD filtering equation (Eq. 4) is applied:

$$P_0' = P_0 + (\Delta t)\sum_{j=1}^{8} C_j \psi(P_j - P_0, T) \qquad \text{(Eq. 4)}$$

where $P_j$ is one of the neighbors in the hollow 3×3 neighborhood, ψ is the influence-function of a robust error-norm, T is a characteristic scale of ψ, the $C_j$ are spatial weights, and Δt is an arbitrary time step for the diffusion filter. In this embodiment, the arbitrary time step Δt relates to a heat diffusion model parameter and is set to Δt=1 so as to provide adequate filter denoising and simplified computation. Other values of Δt may be selected. The parameter $C_j$ provides a spatial weighting. In one embodiment, the $C_j$ factors correspond to a 3×3 binomial filter which is set as follows:

$$C_j = \begin{cases} \frac{1}{4} & j = 0 \\ \frac{1}{8} & j = 2, 4, 5, 7 \\ \frac{1}{16} & j = 1, 3, 6, 8 \end{cases}$$

where subscript j corresponds to the pixel location within the 3×3 neighborhood (shown in FIG. 3) including the center pixel of interest $P_0$ (not shown in FIG. 3).

The influence function ψ corresponds to a photometric weighting function and, in this embodiment, is given by:

$$\psi(\Delta P, T) = \begin{cases} T & \Delta P \geq T \\ \Delta P & |\Delta P| < T \\ -T & \Delta P \leq -T \end{cases}$$

wherein $\Delta P$ is $P_j - P_0$. The above influence function is selected so as to provide a good trade-off between denoising efficiency and image quality. In one embodiment, the preferred characteristic scale is selected as T~32 in the case in which the input image is a document image including text, graphics, and natural images.

It should be noted that other influence functions may be used to perform RAD image filtering. Specific influence functions determine the degree of smoothing dependent on the pixel of interest and its neighborhood type. Hence, different functions may be chosen dependent on the type of input image data.

The smoothed image data is selectively sharpened (13, FIG. 4) using variable contrast stretching as described above. Specifically, the input to the selectively sharpening filter is the output of the RAD filter, (i.e., the selectively smoothed image data, I'). The selectively smoothed image data is then selectively sharpened on a pixel-by-pixel basis.

Two parameters, T and R, used in the method of image processing as shown in FIG. 4 provide significant control over the amount of smoothing and sharpening obtained from the method and hence, also influence both image quality and compressibility. These values can be empirically selected so as to obtain the best compressibility while maintaining acceptable image quality which is, in turn, dependent on the type of image (i.e., natural, graphical, textual, or a combination of these image types) being processed.

For instance, as R is increased, image sharpening decreases and compression ratio slightly increases until it reaches a maximum value. So R may be set so as to obtain the most desirable visual sharpness and the most acceptable compression ratio. Similarly, as T increases so does the compression ratio, however, so does image blurring. Hence, T may be set so as to obtain the most desirable visual smoothness with the most acceptable compression ratio. It was found that setting T=32 and R=128 yielded acceptable visual quality and significantly increased compressibility for document images including text compressed according to the compression method as described in the application entitled "Method Including Lossless Compression of Luminance Channel and Lossy Compression of Chrominance Channels" filed Sep. 29, 2000 and assigned to the assignee of the present invention.

Figure 5:
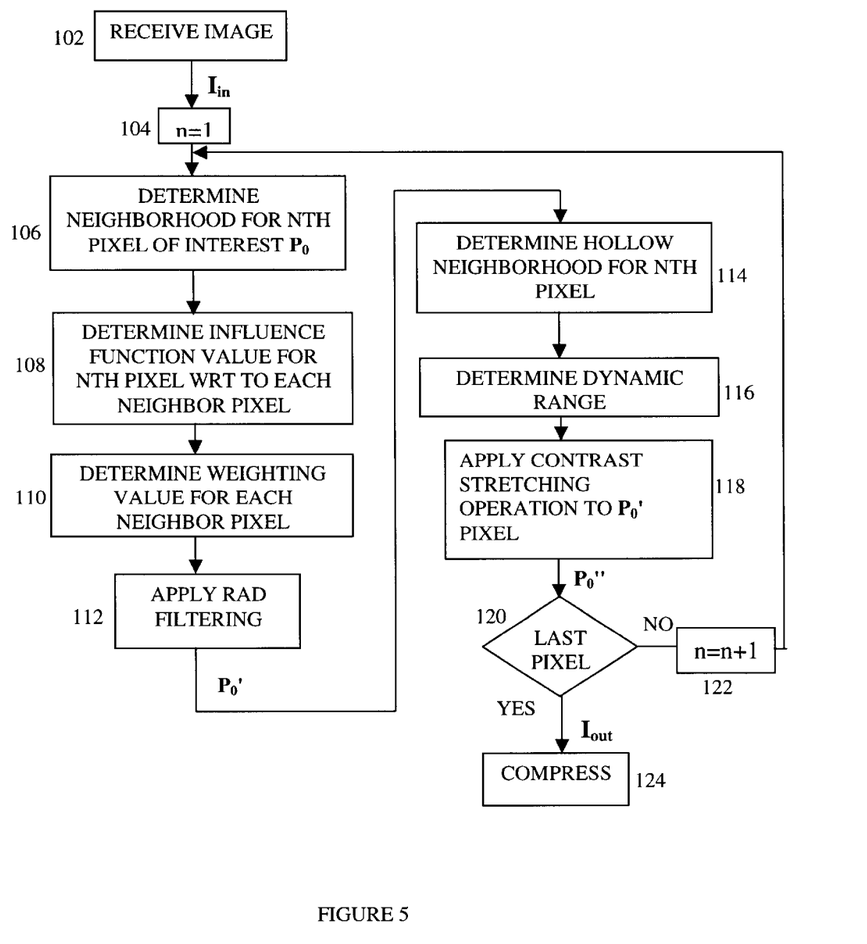
FIG. 5 illustrates a technique of applying the method shown in FIG. 4 to image data.

In one embodiment, the selective smoothing and selective sharpening of the method of FIG. 4 can be combined into a single in-lined pixel-by-pixel process. By combining the pixel processing steps of selective smoothing and selective sharpening, computation time is minimized by reducing the number of times data elements (intensity values, contrast values, etc) are accessed and processed. FIG. 5 shows one technique of applying the method shown in FIG. 4 in a single in-line process where image data is smoothed and then sharpened on a pixel-by-pixel basis.

A digital image $I_{in}$ is accessed or received (block 102). The digital image may be accessed from a digital image file, the digital image may be received one or more lines at a time and processed in real time, etc.

For each pixel of interest $P_0$ (block 104, 120, 122) from digital image data $I_{in}$, a neighborhood of pixels is determined (block 106), an influence function value ψ is determined for each pixel with respect to each pixel j in the neighborhood (block 108), a weighting value $C_j$ is determined for each pixel in the neighborhood (block 110), and the RAD filter function (Eq. 4) is applied to the pixel of interest $P_0$ (block 112) to generate a smoothed pixel of interest $P_0$'. Next, the hollow neighborhood of pixels is determined (block 114), a dynamic range and contrast range of the hollow neighborhood are determined (block 116), and the contrast stretching operation $g(P_0')$ is applied to the pixel of interest $P_0$' (block 118) to generate a smoothed and sharpened pixel value $P_0$". Pixels lying at the boundaries of the digital image will have partial neighborhoods. These boundary pixels may be processed with respect to their partial neighborhoods, or the filtering may be ignored and the boundary pixels may be stored without modification. After smoothing and sharpening each pixel, the resulting digital image data $I_{out}$ may be compressed (block 124). In the case in which the neighborhood size and geometry is the same for each of the smoothing and sharpening processing steps, then the step of determining the neighborhood for the nth pixel (block 106) and the step of determining the hollow neighborhood for the nth pixel (block 114) can be performed in a single step by block 106.

Figure 6:
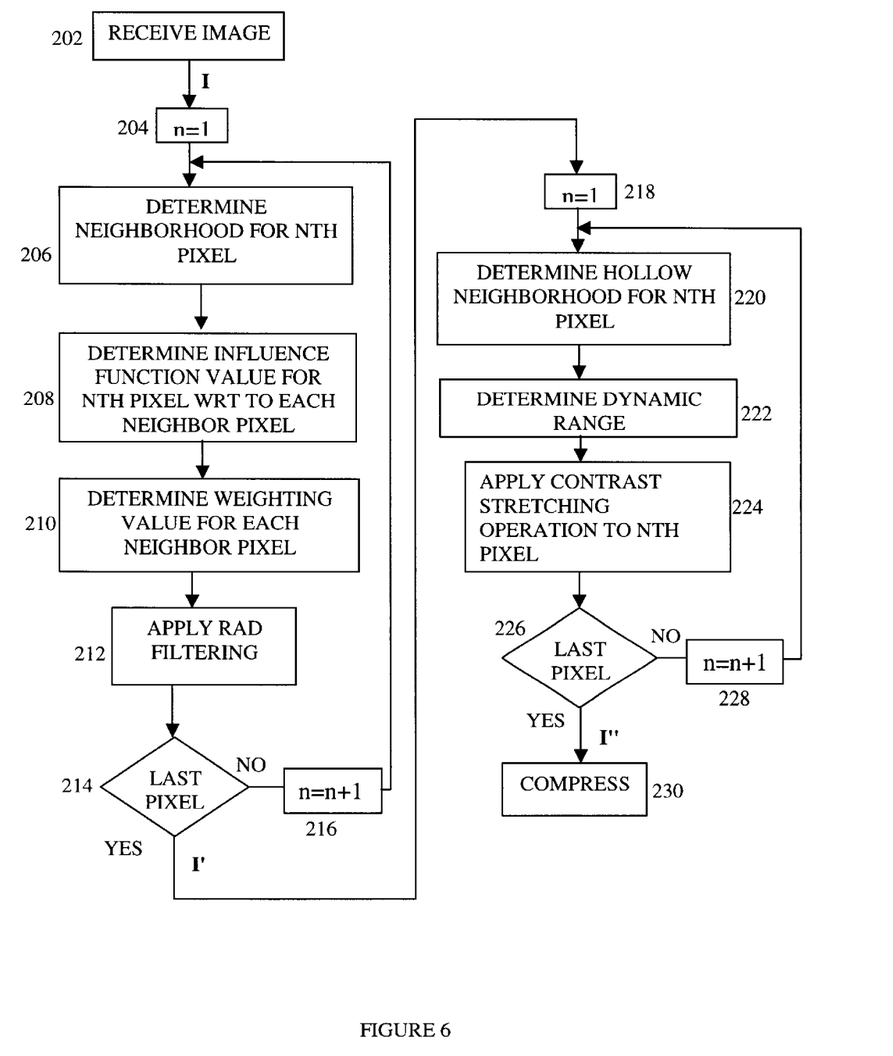
FIG. 6 illustrates another technique of applying the method shown in FIG. 4 to image data.

FIG. 6 shows an alternative embodiment for applying the method as shown in FIG. 4 to a digital image in which image data I is smoothed to generate smoothed data I' and then the smoothed image data I' is sharpened to generate processed data I". A digital image is received (block 202), and for each pixel of interest (block 204, 214, 216) from digital image data I, a neighborhood of pixels is determined (block 206), an influence function value 104 is determined for each pixel with respect to each pixel j in the neighborhood (block 208), a weighting value $C_j$ is determined for each pixel in the neighborhood (block 210), and the RAD filter function (Eq. 4) is applied to the pixel of interest $P_0$ (block 212) to generate smoothed digital image data I'.

For each smoothed pixel of interest (block 218, 226, 228) in the smoothed digital image data I', the hollow neighborhood of pixels is determined (block 220), a dynamic range and contrast range of the hollow neighborhood are determined (block 222), and the contrast stretching operation $g(P_0')$ is applied to the pixel of interest $P_0$' (block 224). After the sharpening filter has been applied to the digital image, the sharpened image may be compressed (block 230).

Figure 7:
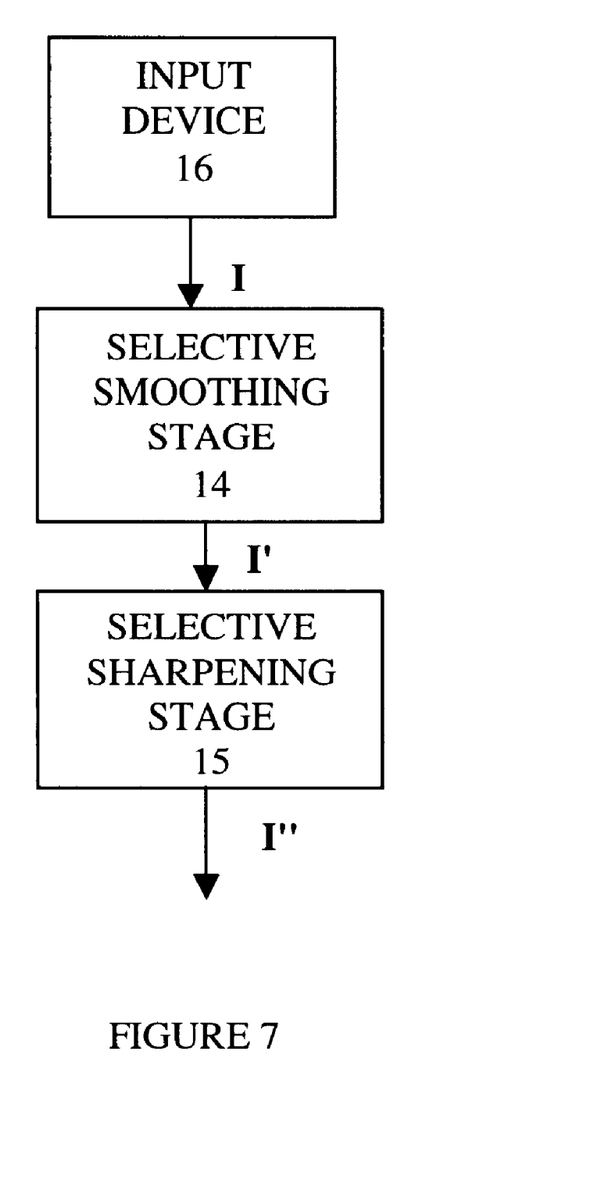
FIG. 7 illustrates an embodiment of the system of image processing of the present invention.

The system for performing the method of image processing shown in FIGS. 1 and 4 may be implemented in hardware, software or a combination of the two. In one embodiment, the system may be implemented in two stages: a first stage for performing selective smoothing and a second stage for performing selective sharpening using variable contrast stretching. FIG. 7, shows one implementation of a system for performing the method of image processing according to FIGS. 1 and 4 including selective smoothing stage 14 coupled to selective sharpening stage 15. An input device 16 such as a scanner or digital camera provides image data I to the selective smoothing stage 14 which processes the image data and provides smoothed data I' to the selective sharpening stage 15 to generate the processed image data I". In this embodiment, stages 14 and 15 may be implemented as hardware, software, or a combination of the two. In an alternative embodiment, stages 14 and 15 are implemented by a processing system including a processor and a memory. In this implementation, the processor processes the image data received from an input device by performing the steps as shown in FIGS. 1 and 4 according to programming instructions.

It should be noted that although a 3×3 square-shaped neighborhood is used when performing both selective image smoothing and sharpening, the system and method of image processing according to the present invention is not limited to such a neighborhood. The neighborhood is not limited to any particular size. The number of pixels is not limited to nine. Although a fixed number of pixels in the neighborhood is preferred for all pixels of interest, the size of the neighborhood may be changed dynamically to accommodate a particular class of image region (e.g., text, graphics, natural features).

The neighborhood is not limited to any particular geometry, although square windows are preferred for performance regions. For example, the shape of the neighborhood may be diamond shaped. In addition, the neighborhood for each of the selective smoothing filtering operation and the selective sharpening operation need not be the same size.

Although the method of image processing can provide acceptable enhancement and increased compressibility in a single iteration/application of the method to the image data, it should be understood that the method of image processing can be performed in multiple iterations on the image data.

The methods of image processing shown in FIGS. 1 and 4 are not limited to documents including both text and natural images. However, it is particularly adaptive to image enhancement and compressibility of textual images or combinations of textual images, with graphics and natural images.

Although the method and system of image processing has been described in connection with grayscale values, it is not so limited. The image processing technique may be applied to color images, for example, images in RGB color space. In this case, the color image is transformed into a human visual system color space such as YCbCr color space. Selective smoothing and selective sharpening is then applied only to the luminance channel (Y) and the resulting color image can be compressed either in the YCbCr color space or in the RGB color space. If it is compressed in the YCbCr color space, the transformation from YCbCr back to RGB is avoided.

In the preceding description, numerous specific details are set forth, such as specific parameter values or influence functions in order to provide a through understanding of the present invention. It will be apparent, however, to one skilled in the art that these specific details need not be employed to practice the present invention. In other instances, well-known filtering operations have not been described in detail in order to avoid unnecessarily obscuring the present invention.

In addition, although elements of the present invention have been described in conjunction with certain embodiments, it is appreciated that the invention can be implement in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

We claim:

1. A method of processing image data including pixel intensity values comprising the steps of:
   selectively smoothing the image data to generate selectively smoothed image data wherein areas characterized as edges within the selectively smoothed image data are essentially preserved;
   selectively sharpening the selectively smoothed image data using variable contrast stretching.

2. The method as described in claim 1 wherein variable contrast stretching is performed by:
   clipping those pixel intensity values outside of a variable range; and
   mapping those pixel intensity values within the variable range.

3. The method as described in claim 1 wherein the step of selectively smoothing is performed using robust anisotropic diffusion (RAD) filtering.

* * * * *